(12) United States Patent
Levy et al.

(10) Patent No.: US 10,094,643 B2
(45) Date of Patent: Oct. 9, 2018

(54) REDUCTION OF ROCKET JET STREAM DISPERSION

(71) Applicant: ISRAEL AEROSPACE INDUSTRIES LTD., Lod (IL)

(72) Inventors: Benjamin Levy, Gedera (IL); Shmuel Goldberg, Kdumim (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 166 days.

(21) Appl. No.: 14/897,227

(22) PCT Filed: Jul. 1, 2014

(86) PCT No.: PCT/IL2014/050590
§ 371 (c)(1),
(2) Date: Dec. 9, 2015

(87) PCT Pub. No.: WO2015/001556
PCT Pub. Date: Jan. 8, 2015

(65) Prior Publication Data
US 2016/0146583 A1  May 26, 2016

(30) Foreign Application Priority Data
Jul. 1, 2013  (IL) .......................................... 227280

(51) Int. Cl.
*F42B 10/30* (2006.01)
*F02K 9/97* (2006.01)
(Continued)

(52) U.S. Cl.
CPC ................ *F42B 10/30* (2013.01); *F02K 9/97* (2013.01); *F42B 10/26* (2013.01); *F42B 10/60* (2013.01)

(58) Field of Classification Search
CPC .......... F42B 10/30; F42B 10/26; F42B 10/60; F42B 10/661; F42B 10/02; F02K 9/97; F41F 3/048; F41G 7/24
See application file for complete search history.

(56) References Cited

U.S. PATENT DOCUMENTS 3,008,379 A * 11/1961 Petre ........................ F41F 3/048
3,045,596 A *  7/1962 Rae ............................ F41G 7/24
(Continued)

FOREIGN PATENT DOCUMENTS

| DE | 10236987 | 3/2004 |
| FR | 2663731 | 12/1991 |
| WO | 2006/086528 | 8/2006 |

OTHER PUBLICATIONS

J. Shandling et al., Control of Missile Dispersion Via Roll Rate Modulation; Journal of Guidance, Control, and Dynamics; vol. 9, No. 6; Dec. 1986; pp. 638-644. (Year: 1986).*

*Primary Examiner* — Bernarr E Gregory
(74) *Attorney, Agent, or Firm* — Dorsey & Whitney LLP

(57) ABSTRACT

The presently disclosed subject matter includes a method, apparatus and computer storage device for reducing dispersion of a rocket caused by jet-stream misalignment, the rocket comprising a rocket engine. Information indicative of a division of total operation time of the rocket engine into a first time period and a second time period is obtained; wherein an impulse which is generated during the first time period is at least approximately the same as an impulse generated during the second time period; a period of time which equals to the first time period starting from time of activation of the rocket engine is measured; upon termination of the period of time, the rocket is rotated around the rocket's longitudinal axis; and the angle of rotation measured; and the rotation is stopped once a 180° rotation is completed.

9 Claims, 2 Drawing Sheets

(51) Int. Cl.
   *F42B 10/26*    (2006.01)
   *F42B 10/60*    (2006.01)
   F42B 10/00     (2006.01)

(56) References Cited

U.S. PATENT DOCUMENTS

| | | | |
|---|---|---|---|
| 3,754,725 A | | 8/1973 | Kartzmark et al. |
| 5,375,792 A | * | 12/1994 | Grau ........................ F42B 10/02 |
| 6,347,763 B1 | * | 2/2002 | Harkins et al. ....... F42B 10/661 |
| 6,478,250 B1 | | 11/2002 | Adams et al. |
| 6,761,330 B1 | | 7/2004 | Bittle et al. |
| 2007/0063095 A1 | * | 3/2007 | Bittle et al. ........... F42B 10/661 |
| 2010/0327106 A1 | | 12/2010 | Brinkerhoff et al. |
| 2012/0080553 A1 | | 4/2012 | Schorr et al. |

\* cited by examiner

REDUCTION OF ROCKET JET STREAM DISPERSION

TECHNICAL FIELD

This invention relates to reduction of rocket dispersion error.

BACKGROUND

Generally, the term "rocket" refers to a cylinder body propelled by a rocket engine which provides thrust to the body by rapid discharge of a jet-stream generated by the burning of a propellant. The jet-stream discharge creates thrust and moves the rocket in a direction opposite to the direction of the jet-stream discharge. One factor which influences rocket dispersion (i.e. deviation of the rocket's thrust line from an intended flight path) during the early stages of flight is the turning moment resulting from jet-stream misalignment. Large dispersion of both guided (such as missiles) and unguided rockets is impermissible for obvious reasons.

Jet-stream misalignment can result from a variety of reasons, including for example inaccurate assembly of the rocket, where the thrust line does not pass through the rocket center of gravity; non-uniform heating of the motor structure before and during burning, which may lead to bending and deviation of the thrust line from the missile's longitudinal (roll) axis; and asymmetric burning, which causes a deviation of jet-stream flow from the nozzle.

One solution for overcoming jet-stream misalignment and the resulting rocket dispersion, which is known in the art, includes causing the rocket to perform multiple quick rotations around the longitudinal axis of the rocket body. Typically around 10 spins of 360° in a second are required. However, this solution provides a limited result as often there may be insufficient time during the burning of the rocket engine for performing the required rotations. Furthermore, it may cause loss of "up position" which may hinder further guiding of missiles.

Thus, there is a need in the art for additional solutions for reducing rocket dispersion caused by jet-stream misalignment.

GENERAL DESCRIPTION

According to one aspect of the presently disclosed subject matter there is provided a method of reducing dispersion of a rocket caused by jet-stream misalignment, the rocket comprising a rocket engine, the method comprising:

obtaining information indicative of a division of total operation time of the rocket engine into a first time period and a second time period; wherein an impulse which is generated during the first time period is at least approximately the same as an impulse generated during the second time period;

measuring a period of time which equals to the first time period starting from time of activation of the rocket engine;

upon termination of the period of time, rotating the rocket around the rocket's longitudinal axis;

measuring an angle of rotation; and stopping turn once a 180° rotation is completed.

According to certain embodiments of the presently disclosed subject matter the method further comprising: obtaining data with respect to a thrust curve of the rocket; and dividing the total operation time of the rocket engine into the first time period and the second time period.

According to certain embodiments of the presently disclosed subject matter a difference between the impulse which is generated during the first time period and the impulse generated during the second time period is smaller than a predefined value.

According to certain embodiments of the presently disclosed subject matter the impulse which is generated during the first time period is equal to the impulse generated during the second time period.

According to another aspect of the presently disclosed subject matter there is provided a jet-stream misalignment reduction unit, comprising: a processing unit operatively connected to a rocket spinning mechanism; the rocket spinning mechanism is configured, responsive to instructions, to spin a rocket around the rocket's longitudinal axis; the processing unit is configured to:

obtain information indicative of a division of total operation time of the rocket engine into a first time period and a second time period; wherein an impulse which is generated during the first time period is at least approximately the same as an impulse generated during the second time period;

measure a period of time which equals to the first time period starting from time of activation of the rocket engine;

upon termination of the period of time, generate instructions to the spinning mechanism to rotate the rocket around the rocket's longitudinal axis; measure an angle of rotation; and generate instructions to the spinning mechanism to stop rotation once a 180° rotation is completed.

According to certain embodiments of the presently disclosed subject matter the processing unit is further configured to divide the total operation time of the rocket engine into the first time period and the second time period, based on data with respect to a thrust curve of the rocket.

According to certain embodiments of the presently disclosed subject matter the processing unit comprises: timing module, spinning control module, and angle determination module; the timing module is configured to measure the period of time;

the spin control module is configured to generate instructions to the spinning mechanism to rotate the rocket around the rocket's longitudinal axis; and the angle measuring module is configured to measure an angle of the rotation.

According to certain embodiments of the presently disclosed subject matter the spinning mechanism is a servo-mechanism.

According to another aspect of the presently disclosed subject matter there is provided a rocket comprising the jet-stream misalignment reduction unit mentioned above.

According to another aspect of the presently disclosed subject matter there is provided a program storage device readable by machine, tangibly embodying a program of instructions executable by the machine to perform a method of reducing dispersion of a rocket caused by jet-stream misalignment, the rocket comprising a rocket engine, the method comprising:

obtaining information indicative of a division of total operation time of the rocket engine into a first time period and a second time period; wherein an impulse which is generated during the first time period is at least approximately the same as an impulse generated during the second time period;

measuring a period of time which equals to the first time period starting from time of activation of the rocket engine;

upon termination of the period of time rotating the rocket around the rocket's longitudinal axis;

measuring an angle of rotation; and stopping rotation once a 180° rotation is completed.

BRIEF DESCRIPTION OF THE DRAWINGS

In order to understand the invention and to see how it may be carried out in practice, embodiments will now be described, by way of non-limiting example only, with reference to the accompanying drawings, in which.

Figure 1:
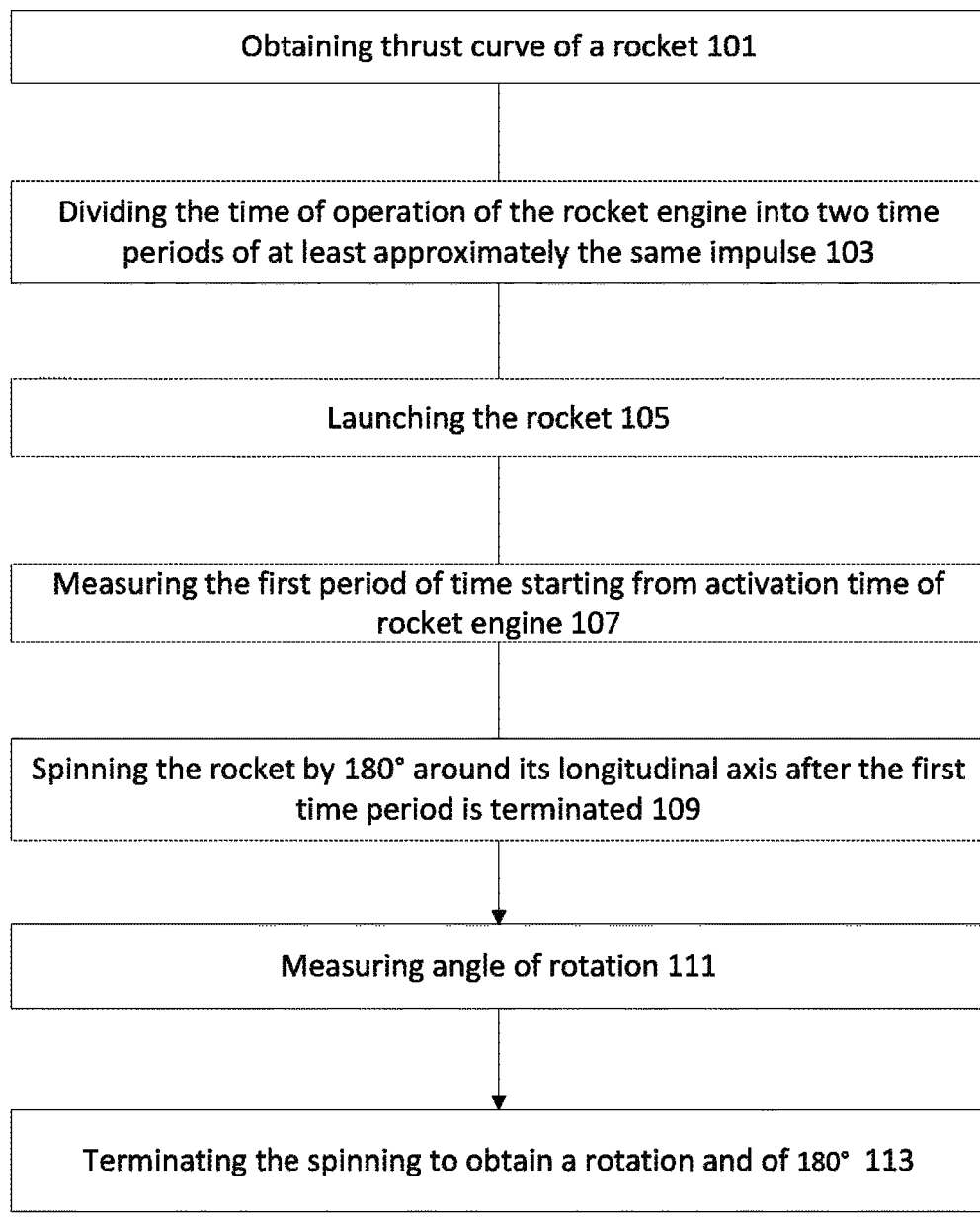
FIG. 1 is a flowchart illustrating an example of a sequence of operations performed, in accordance with the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, various specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "obtaining", "measuring", "generating" or the like, include actions and/or processes of a computer processor that manipulate and/or transform data into other data, said data represented as physical quantities, e.g. such as electronic quantities, and/or said data representing physical objects.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
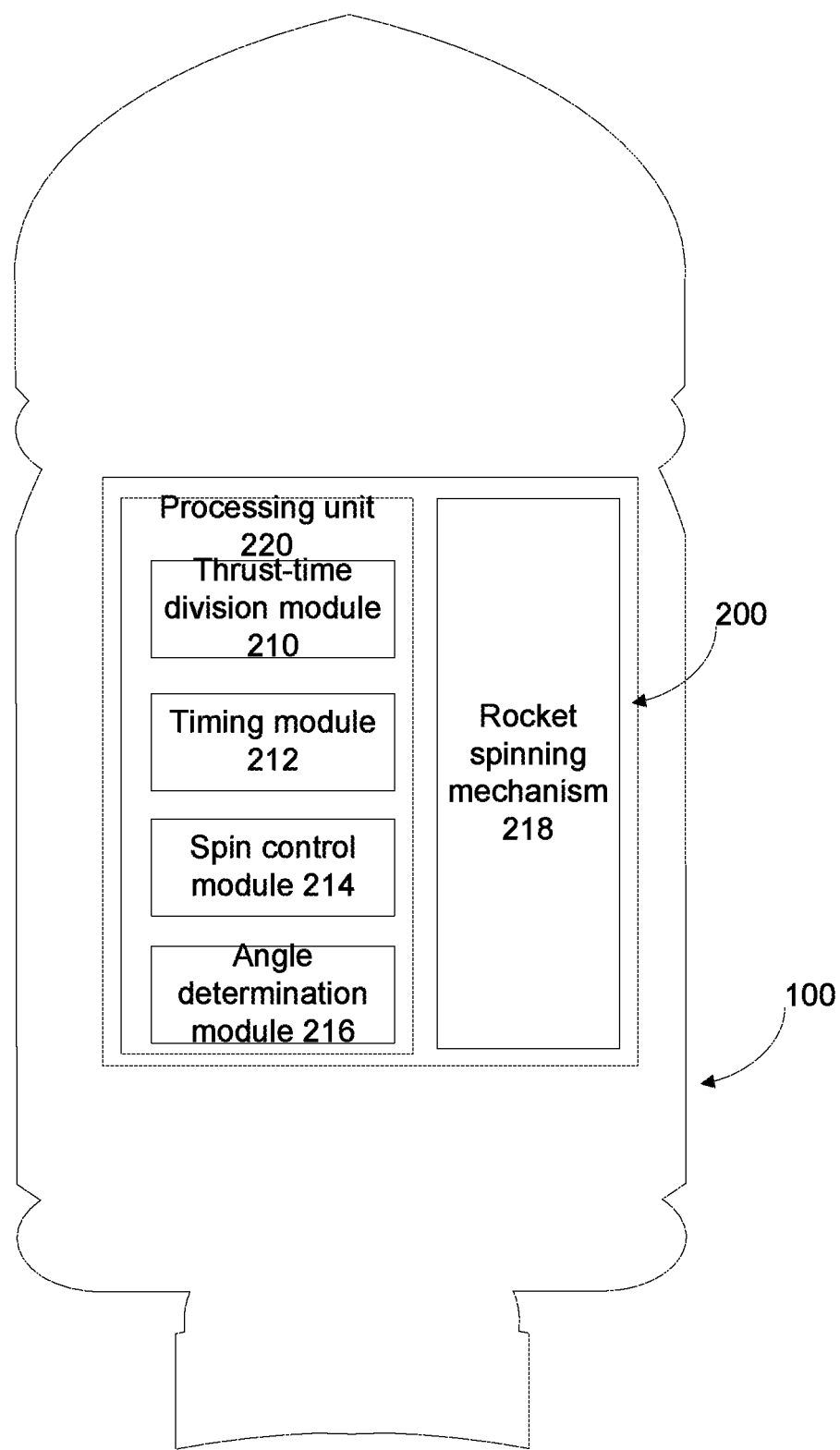
FIG. 2 is a functional block diagram schematically illustrating a jet-stream misalignment reduction unit, in accordance with the presently disclosed subject matter.

In embodiments of the presently disclosed subject matter one or more stages illustrated in FIG. 1 may be executed in a different order and/or one or more groups of stages may be executed simultaneously and vice versa. FIG. 2 illustrates a general schematic of the system architecture in accordance with an embodiment of the presently disclosed subject matter. Modules in FIG. 2 can be made up of any combination of software, hardware and/or firmware that performs the functions as defined and explained herein.

In the following description the term "rocket" includes any rocket propelled body which is susceptible to dispersion resulting from jet-stream misalignment.

FIG. 1 is a flowchart illustrating an example of a sequence of operations performed, in accordance with the presently disclosed subject matter. Part or all of the operations described in reference to FIG. 1 can be performed by the jet-stream misalignment reduction unit 200, described below with reference to FIG. 2.

As known in the art, a thrust curve is a graph showing the thrust of an engine or motor, (usually a rocket engine) with respect to time, during the operation time of the engine. Most engines do not produce linear thrust (thrust which increases at a constant rate with time). Instead, they produce a curve of some type, where thrust rises to a peak, and then falls, or "tails off". Rocket engines, particularly solid-fuel rocket engines, produce consistent thrust curves, making this a useful metric for judging their performance.

According to the presently disclosed subject matter, the thrust curve (thrust vs. time) of a rocket engine is obtained (block 101). An estimation of the thrust curve can be obtained based on a mathematical estimation which is known per se. Alternatively or additionally, the thrust curve can be directly measured with the help of a specifically configured simulation device. The rocket engine is activated in the device and the thrust, which is generated by the engine, is measured. Based on this measurement, a respective thrust curve, showing thrust vs. time, can be plotted.

The thrust (Th) multiplied by time (T) equals impulse (I).

$$Th \times T = I \qquad \text{Equation 1:}$$

The overall thrust multiplied by the overall time of operation of the rocket engine equals the overall impulse.

According to the presently disclosed subject matter (at block 103) the time of operation of the rocket engine is divided into two time periods wherein the impulse generated during the first time period ($T_1$) is equal to the impulse which is generated during the second time period ($T_2$), such that:

$$\int T_1 \times Th_1 = \int T_2 \times Th_2 \qquad \text{Equation 2:}$$

This information can be either calculated or obtained as predetermined input from a different source.

While both sides of equation 2 provide an equal impulse value, since as mentioned above, most engines do not produce linear thrust, the two time periods are not necessarily equal.

It is also noted that the values on the two sizes of equation 2 may not be equal and in some cases they can be sufficiently close such that the difference between the two values is smaller than a predefined value. For example, one factor that may affect the equation is the time which the rocket requires to complete a 180° rotation.

The allowed difference between the two values can be determined to enable reduction of the divergence of the missile from its intended flight path (caused by jet-stream misalignment) to an acceptable value (e.g. determined by a predicted proximity of the hit point to target).

Accordingly, the term "approximately the same" is used herein to indicate that the two impulse values are sufficiently close to enable the required reduction of missile divergence.

The rocket can now be launched (block 105). After launching of the rocket the first time period is measured starting from the time of activation of the rocket engine (block 107). Once the first period of time is elapsed, the missile body is turned around its longitudinal axis (block 109). The angle of the rotation is measured (block 111) and the rotation is terminated once the measured angle of the rotation equals 180° (block 113).

Assuming the missile is susceptible to dispersion resulting from missile jet-stream misalignment, during the first time period the rocket will diverge from the intended flight path towards one side by an angle which is proportional to the generated impulse. Then once the first time period is terminated, the rocket is turned 180° around its longitudinal axis and continues its flight. Because the rocket is rotated by 180°, during the second time period the rocket will diverge from the intended flight path towards the opposite side by an angle which is proportional to the generated impulse. Since the impulse (I) generated during both the first and second time periods is equal, the divergence of the rocket during the first time period would be equal and opposite to the divergence of the rocket during the second time period. Thus, the divergence of the rocket during the first and second time periods cancel out each other, the effect of the jet-stream misalignment is reduced, and the missile flies closer to the intended flight path.

FIG. 2 is a functional block diagram schematically illustrating a jet-stream misalignment reduction unit, in accordance with the presently disclosed subject matter. It is noted that FIG. 2 is merely an example and different and/or additional elements/modules can be used to those depicted in FIG. 2.

Jet-stream misalignment reduction unit 200 can be installed as subsystem of a rocket assembly (illustrated schematically within missile 100). Jet-stream misalignment reduction unit 200 can comprise for example a processing unit and rocket spinning mechanism 218. Processing unit 220 can comprise or be otherwise associated with one or more computer processors and computer memory (including transitory and/or non-transitory memory). The term computer processor as used herein should be expansively construed to cover any kind of electronic device with data processing capabilities, including, by way of non-limiting example, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

Rocket spinning mechanism 218, which can be for example a servomechanism, is configured to cause the rocket to spin around the rocket's longitudinal axis in response to a respective command.

Processing unit 220 can comprise for example, impulse division module 210, timing module 212, spinning control module 214 and angle determination module 216.

Impulse division module 210 can be configured to divide the operation time of a rocket engine into two time periods (a first time period and a second time period), wherein an equal impulse (or at least approximately the same impulse) is generated during both time periods. As explained above with reference to block 103 division of the impulse can be based on the rocket's thrust vs. time curve.

Alternatively, division of the rocket's impulse into two equal (or at least approximately the same) parts can be performed at an alternative location and be provided to impulse division module 210 as input prior to ignition of the rocket engine.

Timing module 212 can be connected to an accurate clock installed on the rocket and configured to measure a period of time that equals to the first time period starting from the time of activation of the rocket engine (as explained above with reference to block 107). Once time module 212 determines that the first time period is terminated, timing module 212 can provide an indication to spin control module 214, which can be configured in turn to instruct spinning mechanism 218 to start spinning the rocket around its axis.

Angle measuring module 216 can be configured to measure the angle of the spin of the rocket and provide an indication to spin control module 214 when a 180° rotation is completed (or is about to be completed). In response, spin control module 214 is configured to instruct spinning mechanism 218 to stop the spinning of the rocket.

It is noted that the presently disclosed subject matter contemplates a rocket or missile which comprises jet-stream misalignment reduction unit 200 as disclosed herein.

It will also be understood that the presently disclosed subject matter further contemplates a transitory and/or non-transitory computer program being readable by a computer for executing the disclosed method. The presently disclosed subject matter further contemplates a machine-readable persistent memory tangibly embodying a program of instructions executable by the machine for executing the disclosed method.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of reducing dispersion of a rocket caused by jet-stream misalignment, the rocket including a rocket engine, the method comprising:
   operating a computer processor operatively coupled to a computer memory and configured to control operation of a rocket spinning mechanism on the rocket by:
     obtaining information indicative of a division of total operation time of the rocket engine into a first time period and a second time period, wherein an impulse that is generated during the first time period is at least approximately the same as an impulse generated during the second time period;
     measuring a period of time that is approximately equal to the first time period starting from time of activation of the rocket engine; and
     upon termination of the period of time, generating instructions for causing the rocket spinning mechanism to rotate the rocket around a longitudinal axis of the rocket, wherein the rocket rotates responsive to the rocket spinning mechanism according to the instructions;
     measuring an angle of rotation; and
     once approximately 180° rotation of the rocket is completed, generating additional instructions for causing the rocket spinning mechanism to stop the rotation of the rocket.

2. The method according to claim 1, further comprising:
   obtaining data with respect to a thrust curve of the rocket; and
   dividing the total operation time of the rocket engine into the first time period and the second time period.

3. The method according to claim 1 wherein a difference between the impulse that is generated during the first time period and the impulse that is generated during the second time period is smaller than a predefined value.

4. The method according to claim 1 wherein the impulse that is generated during the first time period is equal to the impulse that is generated during the second time period.

5. A system for reducing dispersion in a launched rocket cause by jet-stream misalignment, the system comprising:
- a processing unit and a rocket spinning mechanism, the processing unit comprising a computer processor and computer memory and being configured to control operation of the rocket spinning mechanism, the rocket spinning mechanism being configured, responsive to instructions received from the processing unit, to spin the rocket around a longitudinal axis of the rocket;
- the processing unit is configured for reducing jet-stream misalignment, to:
  - obtain information indicative of a division of total operation time of the rocket engine into a first time period and a second time period wherein an impulse that is generated during the first time period is at least approximately the same as an impulse generated during the second time period;
  - measure a period of time that is approximately equal to the first time period starting from time of activation of the rocket engine; and
  - upon termination of the period of time, generate instructions for the rocket spinning mechanism to rotate the rocket around a longitudinal axis thereof, wherein the rocket spinning mechanism rotates the rocket according to the instructions received;
  - measure an angle of rotation; and
  - generate additional instructions for the rocket spinning mechanism to stop rotation of the rocket once approximately 180° rotation is completed, wherein the rocket spinning mechanism stops rotation of the rocket according to the additional instructions received.

6. The system according to claim 5 wherein the processing unit is further configured to divide the total operation time of the rocket engine into the first time period and the second time period, based on data with respect to a thrust curve of the rocket.

7. The system according to claim 5 wherein the rocket spinning mechanism includes a servomechanism.

8. A non-transitory program storage device readable by a computer processor, tangibly embodying a program of instructions executable by the computer processor to perform a method of reducing dispersion of a launched rocket caused by jet-stream misalignment, the method comprising:
- obtaining information indicative of a division of total operation time of a rocket engine of the rocket into a first time period and a second time period, wherein an impulse that is generated during the first time period is at least approximately the same as an impulse generated during the second time period;
- measuring a period of time that is approximately equal to the first time period starting from time of activation of the rocket engine;
- upon termination of the period of time, generating instructions for causing the rocket to rotate around a longitudinal axis of the rocket;
- measuring an angle of rotation; and
- once approximately 180° rotation of the rocket is completed, generating additional instructions for causing the rocket to stop rotating.

9. A rocket with reduced dispersion from an intended flight path caused by jet-stream misalignment, the rocket comprising a subsystem for reducing jet-stream misalignment in the rocket after launch, the subsystem comprising:
- a processing unit and a rocket spinning mechanism, the processing unit comprising a computer processor and computer memory and configured to control the rocket spinning mechanism; the rocket spinning mechanism is configured, responsive to instructions received from the processing unit, to spin the rocket around a longitudinal axis of the rocket;
- the processing unit is configured for reducing jet-stream misalignment, to:
  - obtain information indicative of a division of total operation time of the rocket engine into a first time period and a second time period, wherein an impulse that is generated during the first time period is at least approximately the same as an impulse generated during the second time period;
  - measure a period of time in accordance with the first time period starting from time of activation of the rocket engine; and
  - upon termination of the period of time, generate instructions to the rocket spinning mechanism to rotate the rocket around a longitudinal axis thereof, wherein the rocket spinning mechanism rotates the rocket according to the instructions received;
  - measure an angle of rotation; and
  - generate additional instructions to the rocket spinning mechanism to stop rotation of the rocket once approximately 180° rotation is completed, wherein the rocket spinning mechanism stops rotation of the rocket according to the additional instructions received.

* * * * *